(12) United States Patent
Candela et al.

(10) Patent No.: US 10,387,031 B2
(45) Date of Patent: Aug. 20, 2019

(54) GENERATING A TOUCH-SCREEN OUTPUT OF A SELECTED CHARACTER WITH A SELECTED DIACRITIC

(71) Applicant: INTERNATIONAL BUSINESS MACHINES CORPORATION, Armonk, NY (US)

(72) Inventors: Pierre C. Candela, Antibes (FR); Stephane Hillion, Antibes (FR); Thierry Korman, Valbonne (FR); Frank Wagner, La Colle sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 14/176,758

(22) Filed: Feb. 10, 2014

(65) Prior Publication Data

US 2014/0232670 A1 Aug. 21, 2014

(30) Foreign Application Priority Data

Feb. 20, 2013 (GB) .................................. 1302966.5

(51) Int. Cl.
*G06F 3/041* (2006.01)
*G06F 3/0488* (2013.01)
*G06K 9/00* (2006.01)

(52) U.S. Cl.
CPC ...... *G06F 3/04883* (2013.01); *G06F 3/04886* (2013.01); *G06K 9/00429* (2013.01); *G06F 2203/04808* (2013.01)

(58) Field of Classification Search
CPC .. G06F 3/041; G06F 3/04886; G06F 3/04883; G06F 2203/04808; G06K 9/00429
(Continued)

(56) References Cited

U.S. PATENT DOCUMENTS 5,596,656 A 1/1997 Goldberg
8,059,101 B2 11/2011 Westerman et al.
(Continued)

FOREIGN PATENT DOCUMENTS

EP 0661619 A1 7/1995
EP 1271295 A2 2/2003
(Continued)

OTHER PUBLICATIONS

A. Sacco, "Blackberry Playbook Quick Tip: How to Type Special Characters", CXO Media Inc., cio.com, May 24, 2011, pp. 1-3.
(Continued)

*Primary Examiner* — Temesghen Ghebretinsae
(74) *Attorney, Agent, or Firm* — Law Office of Jim Boice (57) ABSTRACT

A method, system, and/or computer program product operate a touch-screen device. A first touch on a touch-screen is detected, and a character is selected therefrom. A second touch on the touch-screen is detected, and a diacritic is selected therefrom. A location of the second touch on the touch-screen is determined. A location for the diacritic is selected according to a determined location of the second touch on the touch-screen. A specific touch-screen output of a selected character and a selected diacritic is then generated, where the selected diacritic is located on the selected character according to a selected diacritic location.

20 Claims, 6 Drawing Sheets

(58) Field of Classification Search
USPC .......................................................... 345/173
See application file for complete search history.

(56) References Cited

U.S. PATENT DOCUMENTS

| | | | |
|---|---|---|---|
| 8,286,104 B1 | 10/2012 | Yonge-Mallo | |
| 2003/0006967 A1 | 1/2003 | Pihlaja | |
| 2003/0014239 A1 | 1/2003 | Ichbiah et al. | |
| 2004/0012571 A1* | 1/2004 | Katayama | 345/173 |
| 2004/0108994 A1* | 6/2004 | Kato | G06F 3/04886 345/171 |
| 2009/0058823 A1 | 3/2009 | Kocienda | |
| 2009/0256808 A1* | 10/2009 | Kun | G06K 9/00422 345/173 |
| 2009/0265669 A1 | 10/2009 | Kida et al. | |
| 2010/0085313 A1 | 4/2010 | Rider | |
| 2010/0180235 A1* | 7/2010 | Griffin | G06F 3/0236 715/841 |
| 2010/0262905 A1 | 10/2010 | Li | |
| 2012/0206366 A1 | 8/2012 | Vandeputte | |
| 2012/0254786 A1* | 10/2012 | Colley | G06F 3/0233 715/773 |
| 2012/0274573 A1* | 11/2012 | Hwang | 345/171 |

FOREIGN PATENT DOCUMENTS

| | | |
|---|---|---|
| EP | 2506122 A2 | 10/2012 |
| WO | 2003084194 A1 | 10/2003 |
| WO | 2011081354 A2 | 7/2011 |
| WO | 2012083416 A1 | 6/2012 |

OTHER PUBLICATIONS

GB Intellectual Property Office, Search Report for GB Application No. 1302966.5, dated Aug. 22, 2013.

L. Findlater et al., "Beyond Qwerty: Augmenting Touch-Screen Keyboards With Multi-Touch Gestures for Non-Alphanumeric Input", ACM, CHI'12, May 2012, Austin, Texas, pp. 1-4.

X. Bi et al., "Multilingual Touchscreen Keyboard Design and Optimization", Human Computer Interaction, vol. 27, No. 4, 2012, pp. 1-34.

International Searching Authority, International Search Report and Written Opinion for International Application No. PCT/IB2014/058491, dated Apr. 15, 2014.

* cited by examiner

| | | | | | |
|---|---|---|---|---|---|
| acute | ´ | ↙👆 | double acute | ˝ | ↙👆 |
| grave | ` | 👆↘ | double grave | `` | 👆↘ |
| breve | ˘ | ↗👆 | inverted breve | ⌒ | ↗👆 |
| caron / háček | ˇ | ↗👆 | cedilla / cédille | ¸ | ←👆 |
| circumflex / vokáň | ˆ | ↗👆↘ | diaeresis, umlaut | ¨ | 👆 |
| dot | · | 👆 | hook / dấu hỏi | ̉ | ↓→👆 |
| horn / dấu móc | ̛ | →👆 | macron | — | →👆 |
| ogonek / nosiné | ˛ | →👆 | ring / kroužek | ° | ◯👆 |
| rough breathing / dasia | ῾ | ↘👆 | smooth breathing / psili | ᾿ | ↙👆 |

FIG. 5

| apostrophe | ʼ | ⌐↵ | bar | \| | ↓ |
|---|---|---|---|---|---|
| colon | : | 👆 | comma | ʼ | ↙ |
| hyphen | — | → | tilde | ~ | ↗ |
| titlo | ⌐ | ↙ | | | |

FIG. 6

| Arabic Fathah | ́ | ↙ | Arabic Kasrah | ̗ | ↙ |
|---|---|---|---|---|---|
| Arabic Dammah | ̕ | ↓ | Arabic Maddah | ̃ | → |
| Arabic Dagger alif | ˈ | ↓ | Arabic Alif waslah | ̓ | → |
| Japanese dakuten | ◌゙ | ↙ | Japanese handakuten | ◌゚ | 👆 |

FIG. 7

GENERATING A TOUCH-SCREEN OUTPUT OF A SELECTED CHARACTER WITH A SELECTED DIACRITIC

This application is based on and claims the benefit of priority from United Kingdom (GB) Patent Application 1302966.5, filed on Feb. 20, 2013, and herein incorporated by reference in its entirety.

BACKGROUND

This invention relates to a method of operating a touch-screen device and to a touch-screen device. The invention provides a system, method and user interface for capturing diacritics on multi-touch devices.

Multi-touch devices (such as modern phones or tablet computers) are becoming increasingly powerful and popular. The size and speed of these devices has increased over time. However, the size of these portable devices also restricts the size of the touch-screen display that can be used to enter or view text. Those devices usually provide virtual keyboards with a limited number of directly accessible characters to display the biggest possible part of the document being edited. This means that accented characters, or more generally characters with diacritics, require additional inputs from the user.

To enter accented characters (or characters with diacritics), an existing solution is to tap and hold the button for the letter that most closely resembles the character that the user is trying to type. While holding the key down, an additional menu will appear and the user then has to slide their finger to the desired letter with the diacritic. This approach suffers from three major issues. The overall character input speed is slowed down since the user has to wait for the additional menu to appear. Furthermore, the additional menu must present to the user as many keys as possible combinations of diacritics on that letter. And thirdly, this feature is hard to find and many people do not even notice it exists.

Another technique called auto-complete exists and consists of predicting a word or a part of the word based on what has already been typed. This feature is effective when editing text written in a highly-structured, easy-to-predict language but is not suitable for all natural languages. This approach also slows down the overall character input speed since the user has to pick one of the possible prediction in a menu. A third solution called auto-correction (also known as text replacement or replace as you type) takes advantage of a spell checker to correct common spelling or typing errors. By using an auto-correct dictionary, this approach can add diacritics on letters depending on the characters being typed but in certain situations, automatic corrections can cause problems like in technical and scientific writing.

SUMMARY

According to a first aspect of the present invention, there is provided a method of operating a touch-screen device, the method comprising the steps of detecting a first touch on the touch-screen, selecting a character according to the detected first touch on the touch-screen, detecting a second touch on the touch-screen, selecting a diacritic according to the detected second touch on the touch-screen, determining the location of the second touch on the touch-screen, selecting a location for the diacritic according to the determined location of the second touch on the touch-screen, and generating a specific touch-screen output of the selected character and selected diacritic, where the diacritic is located on the character according to the selected diacritic location.

According to a second aspect of the present invention, there is provided a touch-screen device comprising a touch-screen and a processor connected to the touch-screen, the processor arranged to detect a first touch on the touch-screen, select a character according to the detected first touch on the touch-screen, detect a second touch on the touch-screen, select a diacritic according to the detected second touch on the touch-screen, determine the location of the second touch on the touch-screen, select a location for the diacritic according to the determined location of the second touch on the touch-screen, and generate a specific touch-screen output of the selected character and selected diacritic, where the diacritic is located on the character according to the selected diacritic location.

According to a third aspect of the present invention, there is provided a computer program product on a computer readable medium for operating a touch-screen device, the product comprising instructions for detecting a first touch on the touch-screen, selecting a character according to the detected first touch on the touch-screen, detecting a second touch on the touch-screen, selecting a diacritic according to the detected second touch on the touch-screen, determining the location of the second touch on the touch-screen, selecting a location for the diacritic according to the determined location of the second touch on the touch-screen, and generating a specific touch-screen output of the selected character and selected diacritic, where the diacritic is located on the character according to the selected diacritic location.

BRIEF DESCRIPTION OF THE SEVERAL VIEWS OF THE DRAWINGS

Preferred embodiments of the present invention will now be described, by way of example only, with reference to the following drawings, in which.

DETAILED DESCRIPTION

Figure 1:
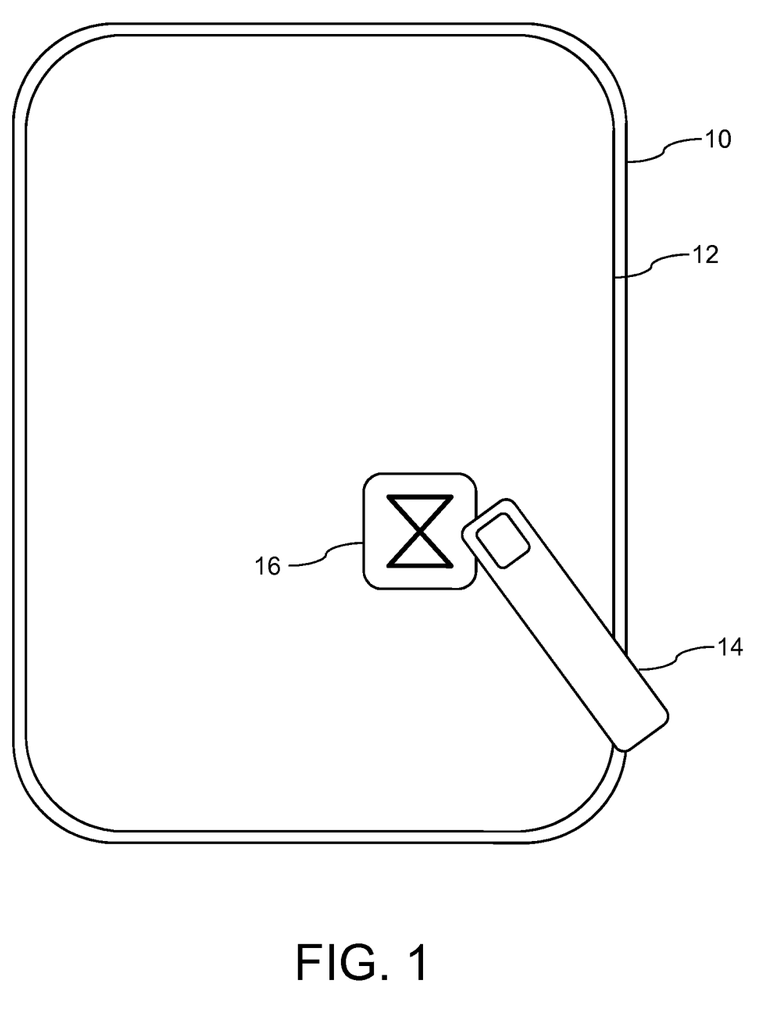
FIG. 1 is a schematic diagram of a touch-screen device.

FIG. 1 shows a touch-screen device 10, which is provided with a touch-screen 12 that comprises almost the entirety of the front surface of the touch-screen device 10. The device 10 could be a tablet computer or a smartphone that provides processing and network connectivity (for example using Wi-Fi). The user of the device 10 interacts with the touch-screen 12 using their finger 14. The touch-screen 12 has display capability and will display icons and applications. A single icon 16 is shown to illustrate the concept. The user selects an icon 16 by touching the touch-screen 12 in the location of the displayed icon 16. The icon 16 will then launch the appropriate application, once touched.

The touch-screen device 10 is a multi-touch device, meaning that the touch-screen 12 is able to detect the presence of more than one touch at the same time. Simultaneous touches by the user on the touch-screen 12 will be detected by the touch-screen 12 of the device 10. This means that a user can use more than one finger 14 when interacting with the touch-screen 12, depending upon the application being used at the time. A drawing application, for example, will allow the user to draw simultaneously on different parts of the touch-screen 12 at the same time, using multiple fingers 14. Each individual touch of a finger 14 on the touch-screen 12 will be recognized.

The touch-screen 12 of the touch-screen device 10 can also detect gestures made with the finger 14. A gesture is a touch of the touch-screen 12 that involves the finger 14 of the user moving over the surface of the touch-screen 12 while in contact with the touch-screen 12. A gesture in a drawing application could be used to draw a continuous line, for example. Gestures can be used in combination with single touches, since the touch-screen device is a multi-touch device and can recognise more than one simultaneous touch of the touch-screen 12. The user can use different fingers of the same or different hands to make simultaneous touches of the touch-screen 12, whether they are single touches or gestures.

Figure 2:
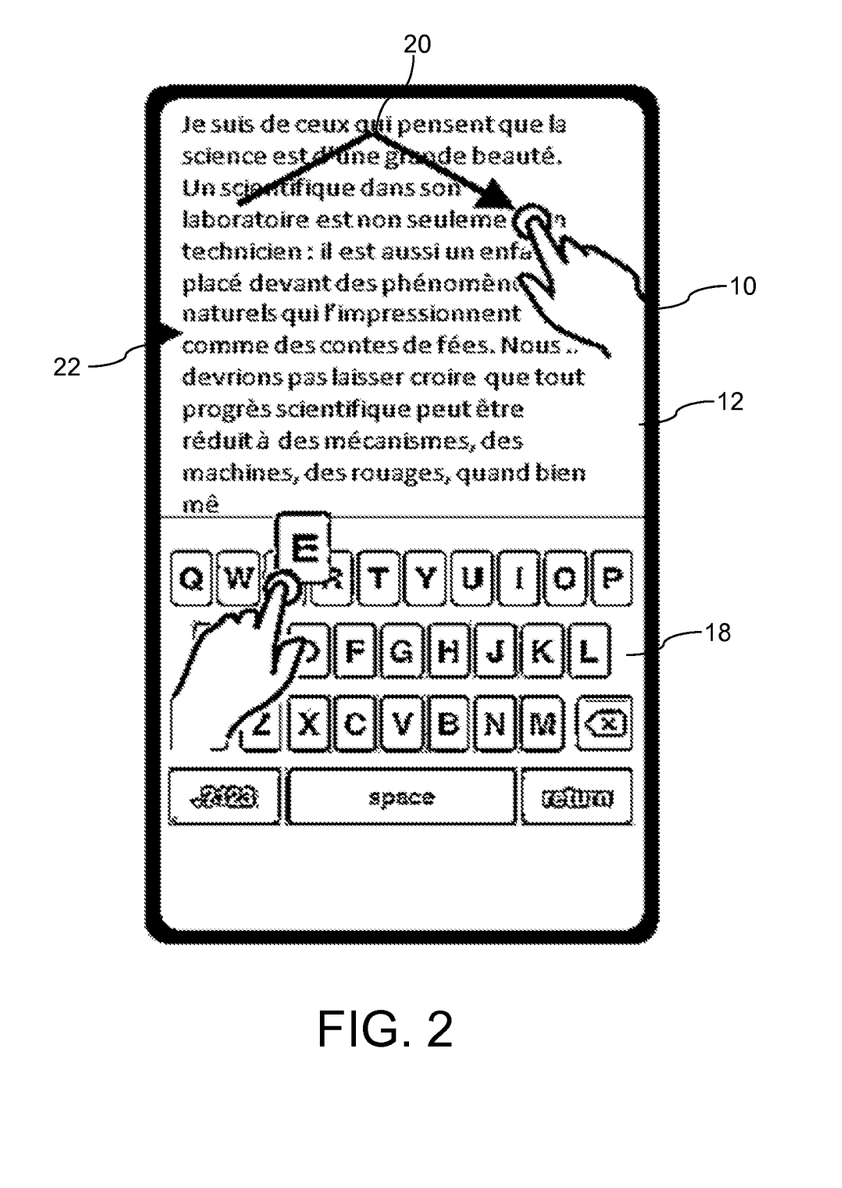
FIG. 2 is a further schematic diagram of the touch-screen device.

FIG. 2 shows a further view of the touch-screen device 10. In this view, the user has launched an application, which is a word processing application where the user can create documents for storing locally or transmitting remotely etc. The lower portion of the touch-screen 12 shows a virtual keyboard 18, where a standard QWERTY keyboard has been displayed on the touch-screen 12, which is effectively mapping small areas of the touch-screen 12 to specific buttons of the virtual keyboard 18. As the user touches the touch-screen 12 in the location of the virtual keyboard 18, then the character that has been touched by the user will be added to the document in the upper portion of the touch-screen 12.

In the example of FIG. 2, the user is using the word processing application to compose a document in the French language. The use of characters with diacritics is common in the French language, and this creates a difficulty for the user of the type of application that is shown in FIG. 2, since the virtual keyboard 18 carries only the standard twenty-six letters of the English language. However, the touch-screen device 10 is configured so that it can be easily used to generate the characters with the diacritics, without the need to use additional menus or other areas of the touch-screen 12 for additional keys for the characters with diacritics.

As can be seen in FIG. 2, the user is generating the character ê (the letter e with a circumflex above). To achieve this character, the user touches the letter e on the virtual keyboard 18 and at the same time makes a gesture at the upper part of the touch-screen 12 that roughly corresponds to the shape of the circumflex. The nature of the gesture is shown by the arrow 20. The user utilised one finger 14 of each hand, simultaneously on the touch-screen 12 and the result is the production of the character ê in the portion of the touch-screen 12 that is showing the word processing document as it is produced.

Displayed at the side of the touch-screen 12 is an indication 22, in the form of a solid black triangle, which serves to split the upper part of the touch-screen 12 in two. This indication 22 is to guide the user as to where to place their gesture 20, in order to indicate where on the character being generated the diacritic should be located. If the user makes the gesture 20 above the indication 22 then the diacritic is to be added above the character being generated and if the user makes the gesture 20 below the indication 22 then the diacritic is to be added below the character being generated.

In this way, the user can indicate the position of the diacritic being added to the character that they are generating according to where on the touch-screen 12 they actually perform the gesture 20. The indication 22 is provided to assist the user, but does not actually have to be shown, if the user is clear in their understanding of the diacritic generation functionality. The display of the indication 22 can be controlled by the user through a user interface toggle. The indication 22 could be in the form of a dotted line that is drawn across the touch-screen 12 to indicate the split between "above the character" and "below the character".

Although the indication 22 of FIG. 2 horizontally splits the upper part of the touch-screen 12 into two equal parts, other types of screen splits may be appropriate, depending, for example, on the language being used. The touch-screen 12 may be displaying two indication 22, for example, that horizontally split the touch-screen 12 into three different portions, or one or more indications 22 may be used that split the screen vertically if that is appropriate for the language being used in the current word processing application. If the screen is split horizontally into three portions, using two indications 22, then the middle portion may be used to indicate a diacritic that is to the side of the character being generated, rather than above or below.

Figure 3:
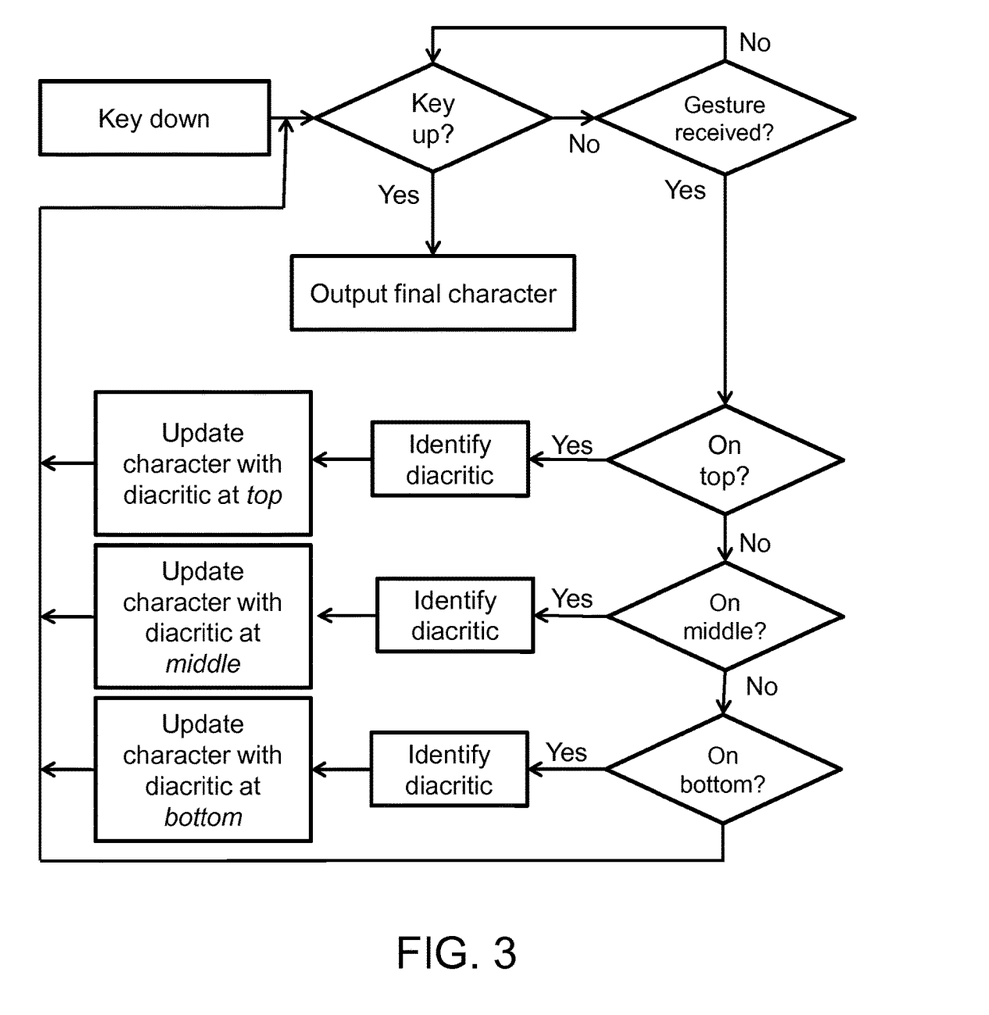
FIG. 3 is a flowchart of a method of generating a character with a diacritic.

FIG. 3 is a flowchart of a method of operating the touch-screen device 10 to produce a character with a diacritic, in an example that uses two different indications 22 that are dividing the usable touch-screen area into three distinct areas. The division is provided by a horizontal dividing of the area of the touch-screen that will be used to input the gesture 20 into the three areas of top, middle and bottom. The method starts by detecting a first touch on the touch-screen 12, which is the box labelled "key down". A check is then made to see if the user has released their touch on the touch-screen 12, which is the "key up?" box.

If the user has released the current key being pressed, then the method terminates with the outputting of the final character. If the key is still pressed then the method proceeds to check to see if a gesture 20 has been received at the "gesture received?" box. If no gesture has been received the method returns to the "key up?" box and cycles between these two boxes until either the user releases the current key or inputs a second touch on the touch-screen 12, which is the gesture 20. Once a gesture 20 has been detected then the method moves to the three boxes that determine the location of the second touch relative to the indications.

The user's gesture is checked to see if it is in the top, middle or bottom location, the diacritical being drawn is identified and the current character is updated with the diacritic at the top, middle or bottom respectively and the method returns to the "key up?" box. Once the user releases their first touch, then the final character is outputted onto the screen 12 of the touch-screen device 10. The method also allows the user to input a second diacritic for the same character, since if they have not released their first touch, then they can input a second gesture 20 and this will be turned into a further diacritic.

Figure 4:
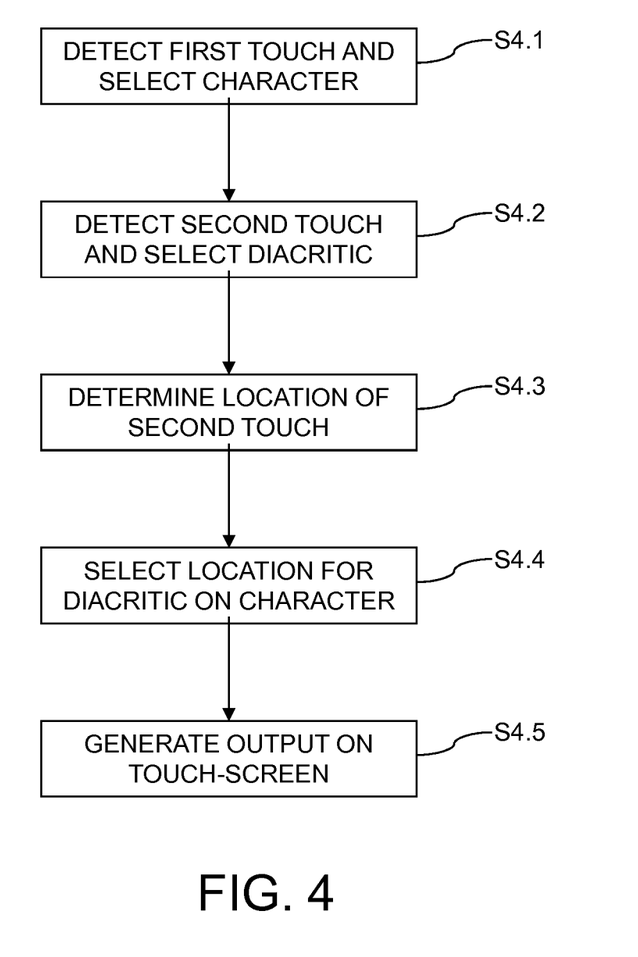
FIG. 4 is a flowchart of a method of operating a touch-screen device.

FIG. 4 is a flowchart of the more general method of operating the touch-screen device 10 to generate a character with a diacritic. The first step, step S4.1 comprises detecting a first touch on the touch-screen 12 and selecting a character according to the detected first touch on the touch-screen 12. In general, a user will be able to touch onto the touch-screen 12 where a virtual keyboard 18 is being shown, with the user's touch determining which character is being generated. The next step, step S4.2 comprises detecting a second touch on the touch-screen 12 and selecting a diacritic according to the detected second touch on the touch-screen 12.

The next step of the method comprises step S4.3, which comprises determining the location of the second touch on the touch-screen 12. In general, this determination of the location of the second touch (the gesture 20) is in broad terms, for example upper part of the touch-screen 12 versus lower part of the touch-screen 12, or is judged relative to a visual indication 22 on the touch-screen 12. Step S4.4 comprises selecting a location for the diacritic according to the determined location of the second touch on the touch-screen 12. As discussed above, the determined location of the second touch (the gesture 20) determines where on the character the selected diacritic will be location.

The final step of the method is step S4.5, which comprises generating a specific touch-screen output of the selected character and selected diacritic, where the diacritic is located on the character according to the selected diacritic location. The chosen character and inputted diacritic is then outputted onto the touch-screen 12, as seen in FIG. 2, for example. In this figure, the character ê has been produced as a result of the first-touch being the letter e, the second touch (the gesture 20) being the input for a circumflex and the location of the gesture input 20 being in the top half of the usable area of the touch-screen 12.

Although the preferred embodiment of the method involves the user inputting the character and the diacritic gesture 20 simultaneously, this is not essential. For example, the user could press and release the letter e, which would output a letter e onto the touch-screen 12. The user could then input the gesture 20 of the circumflex in the top half of the usable area of the touch-screen 12 and this would result in the addition of the detected diacritic (the circumflex) to the last outputted character, at the top of that character. The touch-screen device 12 would therefore turn the letter e into the ê, on the basis of the inputted gesture 20.

The user can also add multiple diacritics to characters, as will be required in some languages. The same basic principles apply, in that the user will make a selection, with a first touch, of a basic character and then will make additional gestures, which can be inputted sequentially, on different parts of the usable area of the touch-screen 12 to add the different diacritics. The specific location of the gesture inputs 20 will determine where on the basic character these multiple diacritics will be located. The basic character can be blank, so that diacritics such as punctuation marks can be added by the gesture 20, again noting where on the touch-screen the gesture is located in order to determine the location of the punctuation mark.

As discussed above, to assist the user, one or more visual indications 22 can be used on the touch-screen 12. The visual indications 22 break up the usable area of the touch-screen 12 into two or more different areas that help the user to place their inputted gesture 20 in the correct place on the touch-screen 12. The visual indications 22 effectively provide horizontal or vertical guidance as to how the touch-screen 12 is broken up into the different areas that correspond to the different possible locations for the diacritic in relation to the basic character that is being produced. The visual indication 22 could be a solid triangle at the side or top of the touch-screen 12 or could be a dotted horizontal or vertical line across the touch-screen 12.

Figure 5:
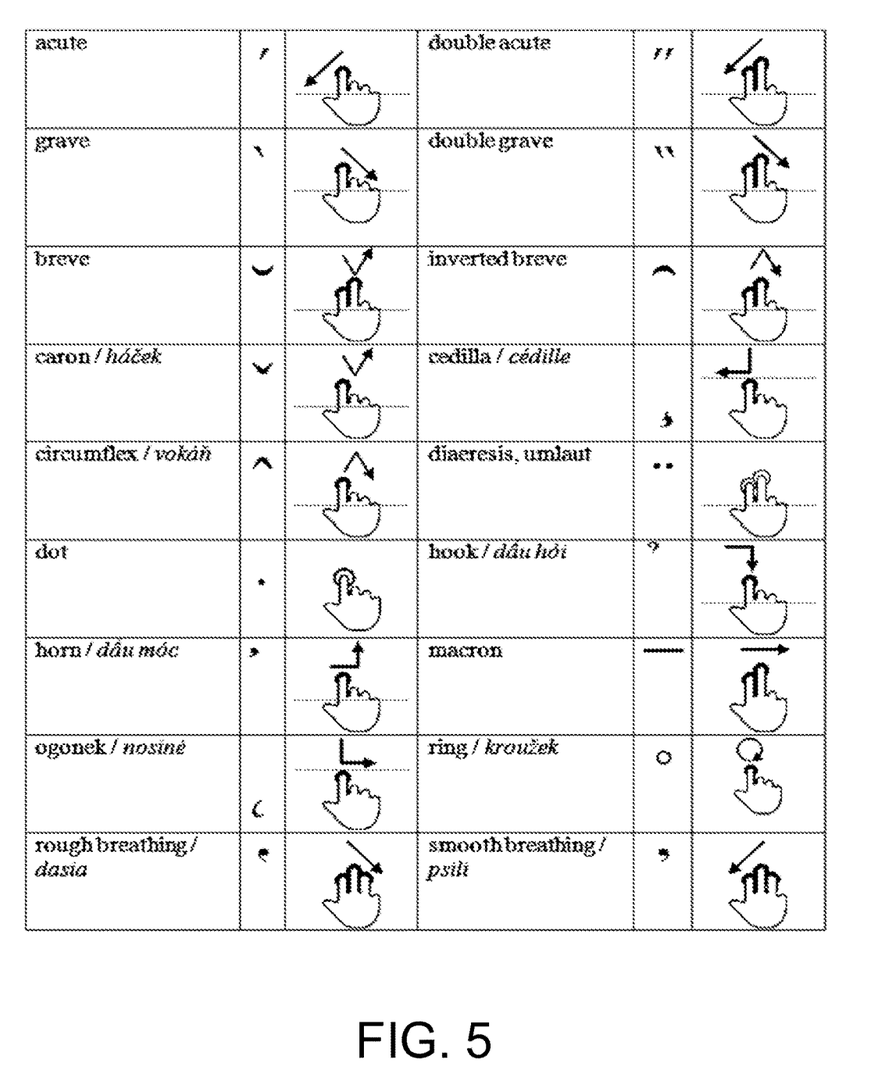
FIG. 5 to FIG. 7 are tables of gestures for use in the generation of diacritics.
Figure 6:
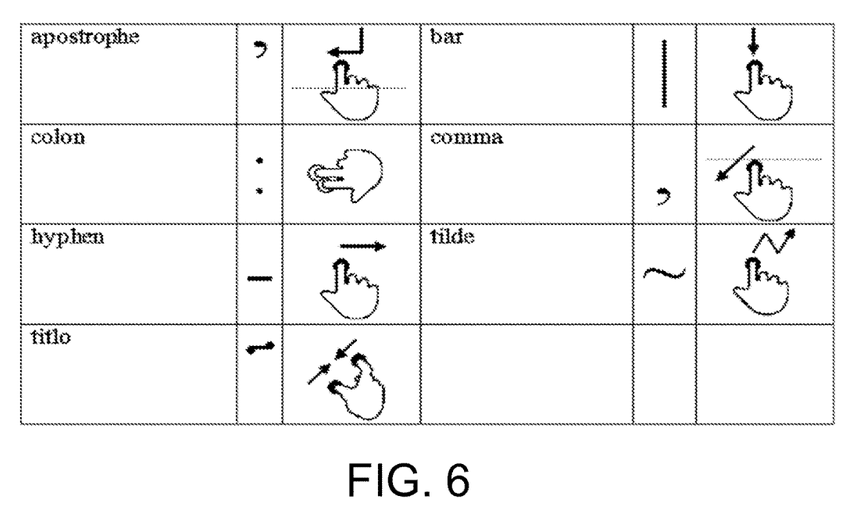
Figure 7:
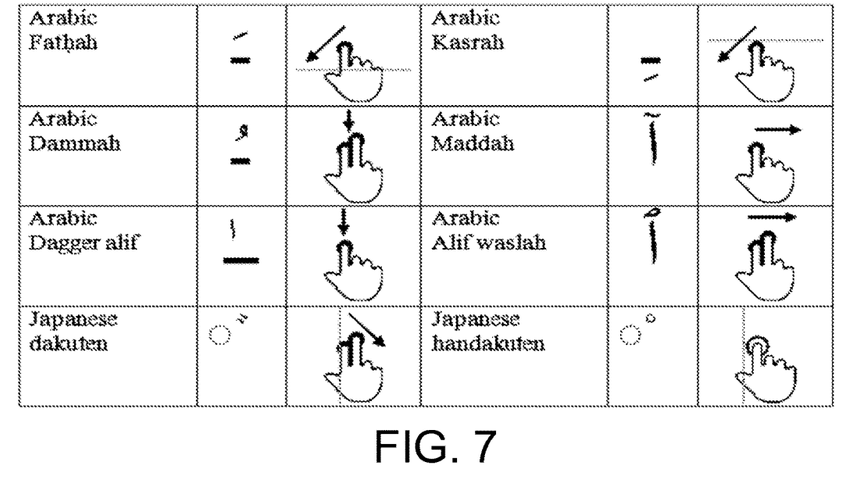

FIG. 5 to FIG. 7 show tables that show gestures 20 that can be used to create different diacritics on a character. These gestures 20 use one or more fingers 14 of a user's hand. FIG. 5 shows some common diacritics used in European languages, such as French and German with the gestures 20 that could be used to create the respective diacritic. FIG. 6 shows how some common punctuation marks could be created using respective gestures 20. FIG. 7 shows how some non-European languages such as Arabic and Japanese could be incorporated into the general scheme of using a gesture 20 to create an appropriate diacritic in the language. In some of the gestures 20 shown in FIG. 5 to FIG. 7, the visual indication 22 is present as a horizontal or vertical dotted line, and this is shown to assist the user in location the diacritic in the correct part of the character being created.

As described herein and owing to the present invention, it is possible to provide a method, system and user interface for capturing diacritics on multi-touch devices. The user will hold the character that they want to modify with a finger and at the same time, use a predefined set of gestures to select one or more diacritical marks, where the location of the gesture on the touch-screen determines where the diacritic is added to the character. The methodology is productive since it does not require a delay to enter the diacritic input and hence the character input speed remains fluid. The methodology is also non-intrusive since it does not require additional on-screen controls and the screen or the edited document is not obscured by an additional menu of some sort. The methodology is also natural and intuitive since it allows combination of multiple diacritics on a single character without limitation on the number of choices or corrections.

The capture of diacritics requires an adequate handling of touch events occurring when the user interacts with, for example, the virtual keyboard of a touch-screen device. In a preferred embodiment, the touch-screen device is arranged to detect touch events in the part of the screen which displays the document, from the moment a key is pressed and until the key is released. For example, to create an e-circumflex the user, with a finger of their left hand, presses the virtual key for the letter E. Using a finger of their right hand, the user simultaneously executes the gesture corresponding to the circumflex diacritic, in an upper part of the touch-screen. The user releases the letter E, the accented letter ê is recognized, with the diacritic positioned above the created character. The gesture made by the user will correspond to the shape of the circumflex and this will be recognized by the touch-screen device and this will be applied to the character selected by the user.

Preferably, the method further comprises displaying an indication on the touch-screen, wherein the step of determining the location of the second touch on the touch-screen is made in reference to the displayed indication. The indication, such as a triangle marker on the left of the available area of the touch-screen, is placed to assist the user. Gestures above the horizontal line from the marker to the right of the touch-screen are recognized as diacritics placed on top of the letter to modify (for example acute). Gestures below this line are bottom diacritics (for example cedilla). Multiple indications can also be used, for example dividing the available area into three equal horizontal areas that define top, middle and bottom as the location of the diacritic.

Gestures for the all of the most common diacritics can be supported. Using gestures to enter diacritics is also perfectly suitable to non-Latin alphabets, such as Arabic, or non-alphabetic scripts such as Japanese. In the case of the Japanese language, or in top to bottom languages more generally, the touch-screen has areas organized vertically instead of horizontally. The indication (such as a triangle marker) would then appear on top rather than on the left. Finally, punctuation marks like dot, comma or apostrophe can be considered as a diacritic added to a blank character. Consequently, the user can enter punctuation marks by holding the spacebar down and performing a predefined gesture. For instance, holding space and tapping in the bottom of the screen will insert a dot.

Advantageously, the method further comprises detecting a third touch on the touch-screen, the third touch occurring subsequent to the second touch on the touch-screen, selecting a second diacritic according to the detected third touch on the touch-screen and adding the second diacritic to the generated touch-screen output. The methodology can be used to support the addition of more than one diacritic to the current character. The user can provide a first gesture to add a first diacritic and then provide a second gesture to add a second diacritic. This can be used to add a first diacritic at the top of the current character and also a second diacritic at the bottom of the current character, for example.

What is claimed is:

1. A method of operating a touch-screen device including a touch-screen, the method comprising:
   detecting, by one or more processors, a first touch on a touch-screen;
   selecting, by one or more processors, a character according to a detected first touch on the touch-screen;
   detecting, by one or more processors, a second touch on the touch-screen, wherein the second touch is from a movement of an input device across a surface of the touch-screen, and wherein the movement is in a shape of a specific diacritic;
   selecting, by one or more processors, the specific diacritic according to a detected second touch on the touch-screen;
   determining, by one or more processors, a location of the second touch on the touch-screen;
   selecting, by one or more processors, a location for the specific diacritic upon the character according to a determined location of the second touch on the touch-screen; and
   generating, by one or more processors, a specific touch-screen output of a selected character and the specific diacritic, wherein the specific diacritic is positioned on the selected character according to a selected diacritic location.

2. The method according to claim 1, wherein the second touch occurs simultaneously with the first touch on the touch-screen.

3. The method according to claim 1, further comprising:
   displaying an indication on the touch-screen, wherein said determining the location of the second touch on the touch-screen is made in reference to the displayed indication.

4. The method according to claim 3, further comprising:
   displaying multiple indications on the touch-screen, wherein said determining the location of the second touch on the touch-screen is made in reference to the displayed multiple indications.

5. The method according to claim 1, further comprising:
   detecting a third touch on the touch-screen, the third touch occurring subsequent to the second touch on the touch-screen;
   selecting a second diacritic according to the detected third touch on the touch-screen; and
   adding the second diacritic to the generated specific touch-screen output.

6. The method of claim 1, further comprising
   partitioning, by one or more processors, the touch-screen into a first section and a second section, wherein the first section displays a touch-screen keyboard and detects the first touch on the touch-screen keyboard, and wherein the second section detects the movement of the input device across the surface of the touch-screen that is in the shape of the specific diacritic;
   splitting, by one or more processors, the second section of the touch-screen into a top section and a bottom section;
   displaying, by one or more processors, a visual indicator on the touch-screen, wherein the visual indicator provides a visual indication of positionings of the top section and the bottom section of the second section of the touch-screen; and
   in response to receiving the second touch from the top section of the second section of the touch-screen, displaying, by one or more processors, the specific diacritic above the selected character on the specific touch-screen output.

7. The method of claim 1, further comprising:
   partitioning, by one or more processors, the touch-screen into a first section and a second section, wherein the first section displays a touch-screen keyboard and detects the first touch on the touch-screen keyboard, and wherein the second section detects the movement of the input device across the surface of the touch-screen that is in the shape of the specific diacritic;
   splitting, by one or more processors, the second section of the touch-screen into a top section and a bottom section;
   displaying, by one or more processors, a visual indicator on the touch-screen, wherein the visual indicator provides a visual indication of positionings of the top section and the bottom section of the second section of the touch-screen; and
   in response to receiving the second touch from the bottom section of the second section of the touch-screen, displaying, by one or more processors, the specific diacritic below the selected character on the specific touch-screen output.

8. A touch-screen device comprising a touch-screen and a processor connected to the touch-screen, the processor arranged to:
   detect a first touch on a touch-screen;
   select a character according to a detected first touch on the touch-screen;
   detect a second touch on the touch-screen, wherein the second touch is from a movement of an input device across a surface of the touch-screen, and wherein the movement is in a shape of a specific diacritic;
   select the specific diacritic according to a detected second touch on the touch-screen;
   determine a location of the second touch on the touch-screen;
   select a location for the specific diacritic upon the character according to a determined location of the second touch on the touch-screen; and
   generate a specific touch-screen output of a selected character and the specific diacritic, wherein the specific diacritic is positioned on the selected character according to a selected diacritic location.

9. The touch-screen device according to claim 8, wherein the second touch occurs simultaneously with the first touch on the touch-screen.

10. The touch-screen device according to claim 8, wherein the processor is further arranged to:
    display an indication on the touch-screen; and
    determine the location of the second touch on the touch-screen in reference to the displayed indication.

11. The touch-screen device according to claim 10, wherein the processor is further arranged to:
    display multiple indications on the touch-screen; and determine the location of the second touch on the touch-screen in reference to the displayed multiple indications.

12. The touch-screen device according to claim 8, wherein the processor is further arranged to:
    detect a third touch on the touch-screen, the third touch occurring subsequent to the second touch on the touch-screen;
    select a second diacritic according to the detected third touch on the touch-screen; and
    add the second diacritic to the generated specific touch-screen output.

13. The touch-screen device of claim 8, wherein the processor is further arranged to:
    partition the touch-screen into a first section and a second section, wherein the first section displays a touch-screen keyboard and detects the first touch on the touch-screen keyboard, and wherein the second section detects the movement of the input device across the surface of the touch-screen that is in the shape of the specific diacritic;
    split the second section of the touch-screen into a top section and a bottom section;
    display a visual indicator on the touch-screen, wherein the visual indicator provides a visual indication of positionings of the top section and the bottom section of the second section of the touch-screen; and
    in response to receiving the second touch from the top section of the second section of the touch-screen, display the specific diacritic above the selected character on the specific touch-screen output.

14. The touch-screen device of claim 8, wherein the processor is further arranged to:
    partition the touch-screen into a first section and a second section, wherein the first section displays a touch-screen keyboard and detects the first touch on the touch-screen keyboard, and wherein the second section detects the movement of the input device across the surface of the touch-screen that is in the shape of the specific diacritic;
    split the second section of the touch-screen into a top section and a bottom section;
    display a visual indicator on the touch-screen, wherein the visual indicator provides a visual indication of positionings of the top section and the bottom section of the second section of the touch-screen; and
    in response to receiving the second touch from the bottom section of the second section of the touch-screen, display the specific diacritic below the selected character on the specific touch-screen output.

15. A computer program product for operating a touch-screen device including a touch-screen, wherein the computer program product comprises a non-transitory computer readable storage device having program instructions embodied therewith, the program instructions readable and executable by a computer to perform a method comprising:
    detecting a first touch on a touch-screen;
    selecting a character according to a detected first touch on the touch-screen;
    detecting a second touch on the touch-screen, wherein the second touch is from a movement of an input device across a surface of the touch-screen, and wherein the movement is in a shape of a specific diacritic;
    selecting the specific diacritic according to a detected second touch on the touch-screen;
    determining a location of the second touch on the touch-screen;
    selecting a location for the specific diacritic upon the character according to a determined location of the second touch on the touch-screen; and
    generating a specific touch-screen output of a selected character and the specific diacritic, wherein the specific diacritic is positioned on the selected character according to a selected diacritic location.

16. The computer program product according to claim 15, wherein the second touch occurs simultaneously with the first touch on the touch-screen.

17. The computer program product according to claim 15, wherein the method further comprises:
    displaying an indication on the touch-screen, wherein said determining the location of the second touch on the touch-screen is made in reference to the displayed indication.

18. The computer program product of claim 17, wherein the method further comprises:
    displaying multiple indications on the touch-screen, wherein said determining the location of the second touch on the touch-screen is made in reference to the displayed multiple indications.

19. The computer program product of claim 15, wherein the method further comprises:
    detecting a third touch on the touch-screen, the third touch occurring subsequent to the second touch on the touch-screen;
    selecting a second diacritic according to the detected third touch on the touch-screen; and
    adding the second diacritic to the generated specific touch-screen output.

20. The computer program product of claim 15, wherein the method further comprises:
    partitioning the touch-screen into a first section and a second section, wherein the first section displays a touch-screen keyboard and detects the first touch on the touch-screen keyboard, and wherein the second section detects the movement of the input device across the surface of the touch-screen that is in the shape of the specific diacritic;
    splitting the second section of the touch-screen into a top section and a bottom section;
    displaying a visual indicator on the touch-screen, wherein the visual indicator provides a visual indication of positionings of the top section and the bottom section of the second section of the touch-screen; and
    in response to receiving the second touch from the top section of the second section of the touch-screen, displaying the specific diacritic above the selected character on the specific touch-screen output.

* * * * *

UNITED STATES PATENT AND TRADEMARK OFFICE
CERTIFICATE OF CORRECTION

| | |
|---|---|
| PATENT NO. | : 10,387,031 B2 |
| APPLICATION NO. | : 14/176758 |
| DATED | : August 20, 2019 |
| INVENTOR(S) | : Candela et al. |

It is certified that error appears in the above-identified patent and that said Letters Patent is hereby corrected as shown below:

On the Title Page

Item (72), Line 3, the name listed for co-inventor is changed from THIERRY KORMAN to THIERRY KORMANN.

Signed and Sealed this
Twenty-first Day of April, 2020

Andrei Iancu
*Director of the United States Patent and Trademark Office*